Feb. 21, 1933.  P. TURK  1,898,912

CONVERTIBLE VEHICLE SEAT

Filed Nov. 16, 1931

Peter Turk,
INVENTOR

BY Victor J. Evans & Co.
HIS ATTORNEYS

Patented Feb. 21, 1933

1,898,912

UNITED STATES PATENT OFFICE

PETER TURK, OF CHICAGO, ILLINOIS

CONVERTIBLE VEHICLE SEAT

Application filed November 16, 1931. Serial No. 575,364.

This invention relates to certain novel improvements in convertible vehicle seats, and has for its principal object the provision of an improved construction of this character which will be highly efficient in use and economical in manufacture.

Among the objects of this invention are: To provide an improved convertible seat construction for vehicles and which construction includes relatively stationary horizontal seats and relatively movable panels; to provide novel, efficient and simple means by which the movable panels of the seat construction may be readily moved from panel or back-rest position to horizontal position to provide with the stationary sections, in the latter case, a bed within the vehicle.

Other objects will appear hereinafter.

The invention consists in the novel combination and arrangement of parts to be hereinafter described and claimed.

The invention will be best understood by reference to the accompanying drawing, showing the preferred form of construction and in which.

Figure 1:
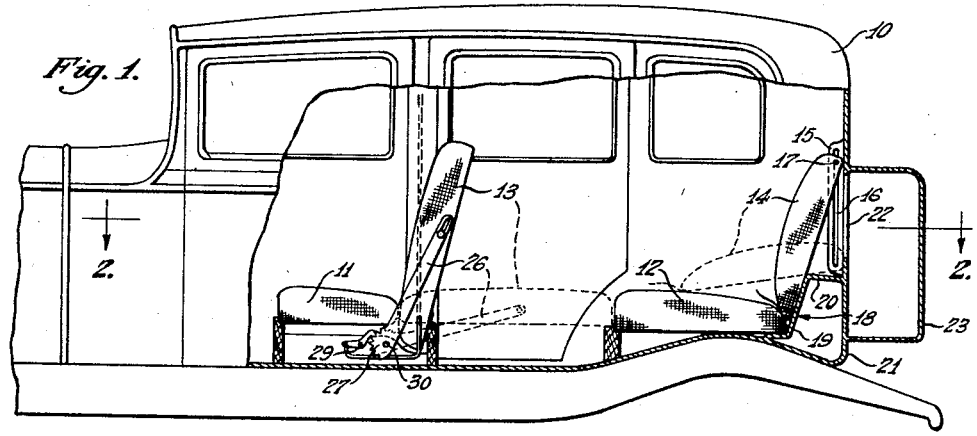
Fig. 1 is a fragmentary side elevational view of a conventional vehicle illustrating the invention associated therewith.

In the drawing, which illustrates a preferred and practical embodiment of the invention, a vehicle body is indicated generally at 10 and arranged therein is a pair of spaced relatively stationary seats or cushions 11 and 12. Associated with the seat or cushion 11, in a manner to be explained more fully hereinafter, is a movable panel or cushion 13, and associated with the seat 12 is a movable panel or cushion 14, and this invention includes means by which the panels or cushions 13 and 14 may be moved from full to dotted line positions of Fig. 1 whereby to provide a bed within the body 10.

To accomplish this end I mount on the body 10 at each end of the panel 14 a bracket 15 which is provided with a vertical slot 16 and attached to each end of the panel 15 is a pin 17 which rides in the adjacent slot 16. A supporting frame 18 for the panel 14 includes a portion 19 inclined at an angle between horizontal and vertical so that the bottom portion of the panel 14 rests thereagainst when said panel 14 is in the full line position of Fig. 1 whereby to provide a panel for the seat or cushion 12. To move the panel or cushion 14 from its full line position in Fig. 1 to dotted line position of the same figure, the panel or cushion 14 is lifted upwardly, the pins 17 traveling in the slots 16, and the lower end of the panel or cushion 14 is then pulled forwardly whereby the front end of the panel 14 rests upon the seat or cushion 12 and the rear end of the panel or cushion 14 rests upon a horizontal portion 20 of the supporting frame 18 and thereby provides a head rest or pillow.

In the rear wall 21 of the body 10 an opening 22 is provided so that when the panel 14 is in dotted line position at Fig. 1 bed clothing may be drawn from a storage container 23 at the rear of the body 10, through the opening 22 into the body 10.

Figure 3:
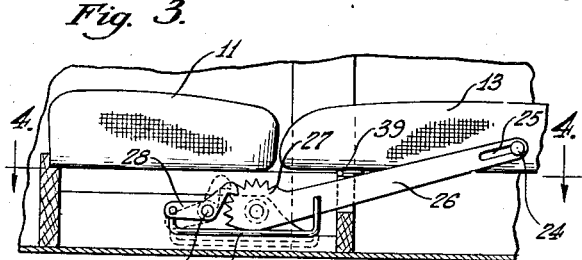
Fig. 3 is a sectional view on line 3—3 in Fig. 2.
Figure 5:
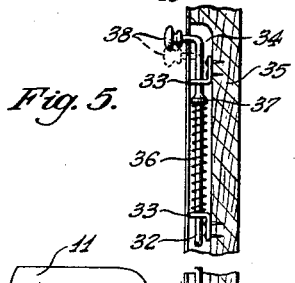
Fig. 5 is a sectional view on line 5—5 in Fig. 4.

To move the panel 13 I attach to each side thereof a pin 24 which rides in a slot 25 provided in one end of a bar 26, each of which bars has at its other end a segmental ratchet 27. The panel 13 is held in upright position by a pair of dogs 28 which are fixed on a rockable shaft 29 while the segments 27 are mounted on a shaft 30. Attached to each of the dogs 28 is a horizontally extending end portion 31 of a plunger rod 32 which is vertically slidable in brackets such as 33, that are mounted in a slot 34 in the vehicle body post 35. On each of the rods 32 is a shoulder 37 and on the rods 32 between the shoulders 37 and one of the fixed brackets 32 are coil springs 36 which urge the rods 32 upwardly, and thereby tend to rotate the shaft 29 clockwise (Fig. 3) so as to engage the dogs 28 with the segments 27 and thus hold the panel 11 in upright position.

Figure 2:
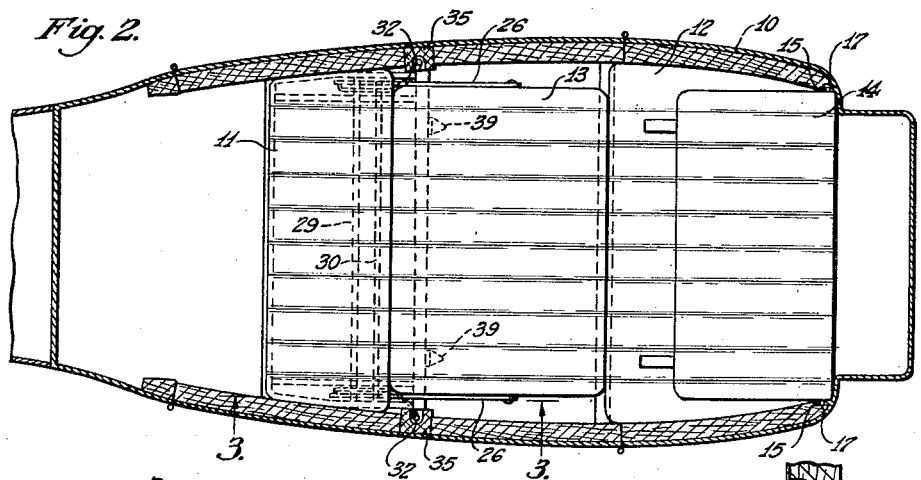
Fig. 2 is a sectional view, partly in plan, on line 2—2 in Fig. 1.
Figure 4:
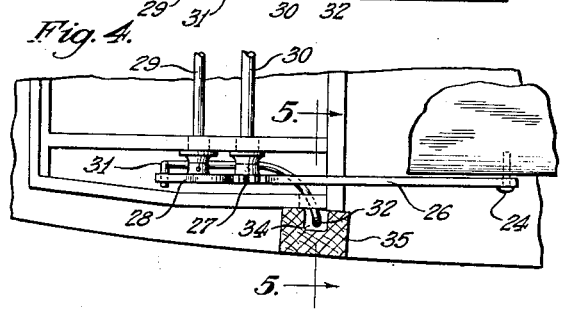
Fig. 4 is a sectional view on line 4—4 in Fig. 3.

In order to drop the panel 11 down into horizontal (dotted line) position of Figs. 1, 2 and 4 whereby it will co-operate with the seats 11 and 12 and panel 14 to form a bed or mattress it is merely necessary to depress either one of the plungers 32 by means of suitable finger grips 38 provided thereon; since depression of either plunger will rock the shaft 29 (counterclockwise Fig. 3) and release the dogs 28 from the ratchet segments 27, permitting the panel 13 to swing downwardly on its hinges 39.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claims as new and desire to protect by Letters Patent is:

A convertible seat construction comprising relatively stationary front and rear seats having a space therebetween, panels or back-rests for said seats and movable relative thereto, means for lowering the front panel into horizontal position in, and raising it from, said space, and means for guiding the rear panel downwardly into, and upwardly from, a position in which it reclines at a slight angle upon the rear seat with its front edge projected well forwardly of and resting upon the rear seat, whereby said front and rear panels when in lowered position will co-operate with said seats to form a bed.

In testimony whereof I affix my signature.

PETER TURK.